May 20, 1924.
R. P. MASE
CONSTANT GAS FLOW REGULATOR
Filed Sept. 1, 1922
1,494,856
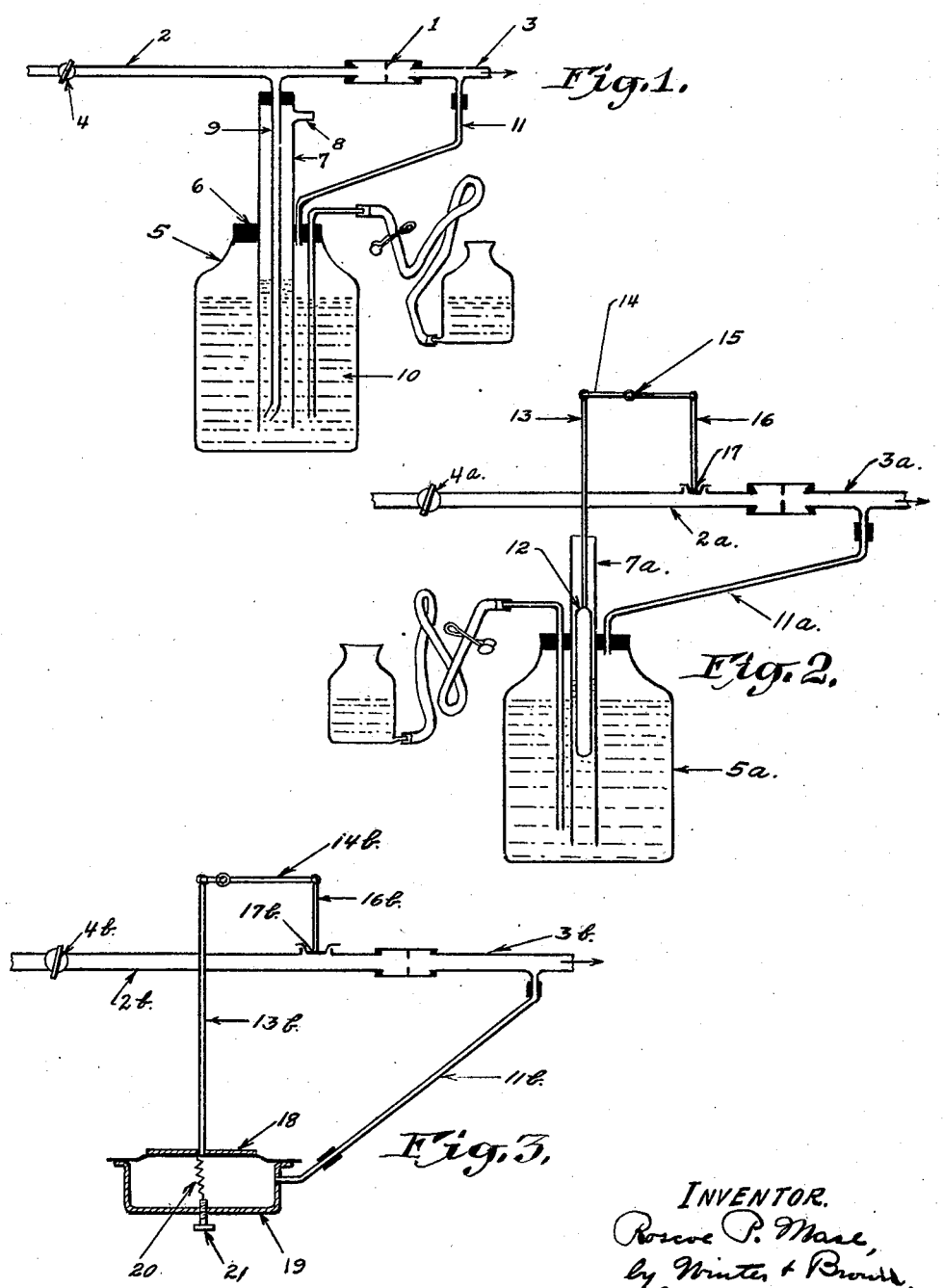

Patented May 20, 1924.

1,494,856

UNITED STATES PATENT OFFICE.

ROSCOE P. MASE, OF WILKINSBURG, PENNSYLVANIA.

CONSTANT-GAS-FLOW REGULATOR.

Application filed September 1, 1922. Serial No. 585,823.

*To all whom it may concern:*

Be it known that I, ROSCOE P. MASE, a citizen of the United States, and a resident of Wilkinsburg, in the county of Allegheny and State of Pennsylvania, have invented a new and useful Improvement in Constant-Gas-Flow Regulators, of which the following is a specification.

The object of this invention is to provide apparatus whereby the volumetric flow of gas through a conduit may be automatically maintained at a constant or substantially constant rate. The invention may be used wherever it is necessary or desirable to maintain a constant rate of flow of a gas, and is particularly applicable to chemical processes and continuous gas analysis methods wherein such a measured flow of gas is necessary.

Heretofore the usual practice in maintaining a constant rate of gas flow has been to provide a gas conduit with a constricted portion dividing the conduit into high and low pressure sections, and connect a U-tube to the conduit, one leg being attached at one side of the constriction and the other at the other side. A body of liquid is placed in the U-tube, and a scale between the two columns of liquid in the legs of the tube indicates the difference between the levels of the liquid and hence the difference between the pressures of gas at opposite sides of the constriction. When the desired difference in pressure has been established it is maintained by manual control of a valve arranged in the conduit. To be assured of a rate of flow which is constant within the permissible range of variation, it is necessary to watch the U-tube quite closely, principally because variations in resistance to flow of gas cause quite large variations in the gas pressure relation between the two sides of the constriction.

According to the present invention a conduit through which gas flows is provided with a constricted portion which divides the conduit into high pressure inlet and low pressure outlet sections, and means are associated with the conduit sections for automatically maintaining a substantially constant differential between the pressures of gas flowing through the two conduit sections. The automatic control means include a gas relief valve on the high pressure or inlet conduit section, and pressure operated means communicating with the low pressure or outlet conduit section for controlling the relief valve.

In the accompanying drawings there are diagrammatically illustrated in Figs. 1, 2 and 3 three embodiments of the invention, the several views of the apparatus being vertical central sections.

Having reference first to the embodiment of the invention illustrated in Fig. 1, a gas conduit is divided by means of an orificed diaphragm 1 into a high pressure inlet section 2 and a low pressure outlet section 3. Flow of gas into the inlet section may be controlled by a valve 4 which may be an ordinary manually operated valve, or, if desired, an automatic pressure reducing valve. In this, the preferred embodiment of the invention, the gas relief valve on the high pressure conduit section takes the form of a tube extending from such conduit section to the bottom portion of a liquid column, the tube having an open end at the bottom of such column so that gas may escape from the lower end of the tube under pressure depending upon the height of the column of liquid above the end of the tube. The column of liquid which controls the pressure of the gas in the high pressure conduit section is regulated in such manner that the height of the column varies in proportion to the gas pressure changes in the low pressure section of the conduit.

Referring again to Fig. 1, a suitable container, which may take the form of a large bottle 5, is provided with a gas tight stopper 6 through which there extends a tubular casing 7. The horizontal cross section of container 5 should be quite large in relation to casing 7. The lower end of casing 7 extends nearly to the bottom of container 5 and its upper end is provided with an opening 8 whereby the casing may be open to the atmosphere or be placed in communication with a gas-receiving vessel. A tube 9 is attached at its upper end to conduit section 2, and has its lower end open a little above the bottom of casing 7. Within container 5 there is a body of liquid 10 which also fills the lower portion of casing 7 and forms a liquid column exerting its pressure in valve-like form against the lower end of tube 9. A tube 11 connects conduit section 3 with the interior of container 5 above the liquid therein so that the pressure of gas in section 3 is transmitted to the body of liquid 10 outside of casing 7 and thereby controls the height of the column of liquid within the casing.

In the operation of the apparatus there is first placed in the gas conduit a diaphragm 1 having an orifice or capillary of the size required to give the desired rate of flow with a given pressure differential. The particular liquid placed in container 5 is determined by the use to which the apparatus is to be put, consideration being given both to the chemical properties of the liquid and to its specific gravity. Valve 3 is regulated so that when the gas is flowing normally through the conduit a small amount of gas will escape from the bottom of tube 9 against the hydrostatic pressure of the column of liquid within casing 7. This gas may escape either to the atmosphere or through opening 8 or to a suitable gas receiver attached to this opening.

When the pressure of gas in the low pressure conduit section 3 increases, the column of liquid within casing 7 proportionately rises and prevents the escape of gas through the lower end of tube 9 until the pressure of gas in conduit section 2 has increased in proportion to that of the gas in section 3. In a similar manner when the pressure of the gas in conduit 3 diminishes, the height of the column of liquid in casing 7 is lowered thereby diminishing by an equal amount the pressure in section 2. In this way there is automatically maintained a constant difference between the pressures of gas in the two conduit sections on opposite sides of the constricted portion or diaphragm 1. It has been found that, within the range of accuracy required by the precision of gas flow measurements, the rate of flow of gas through the conduit may be maintained constant.

In the embodiment of the invention illustrated in Fig. 2 the liquid column valve of Fig. 1 is displaced by a float-controlled valve. Within casing $7^a$ there is a float 12 which, through rod 13, a lever 14 pivoted at 15 to a suitable support, and a link 16, controls a valve 17 attached to high pressure conduit section $2^a$. Otherwise the apparatus of Fig. 2 is the same as that of Fig. 1.

In the operation of the apparatus of Fig. 2, valve 17 is so set that a small amount of gas escapes through it when gas is flowing normally through the conduit. When the pressure of gas in conduit section $3^a$ increases, the liquid in $7^a$ rises, exerting pressure on float 12. This pressure is transmitted to valve 17 thereby increasing gas pressure in the high pressure side of conduit. When pressure in section $3^a$ diminishes, valve 17 will similarly be under less pressure. Thus, irrespective of the changes of pressure usually experienced, the pressure differential is automatically maintained constant so that the rate of flow is substantially the same.

In the embodiment of the invention illustrated in Fig. 3 the gas relief valve $17^b$ is connected, through a rod $16^b$, a pivoted lever $14^b$ and a rod $13^b$, to a flexible diaphragm 18 which closes an opening in a casing 19 placed in communication with low pressure conduit section $3^b$ by means of a tube $11^b$. The diaphragm may be held yieldingly towards casing 19 by means of a spring 20, the tension of which may be adjusted by a suitable screw 21. The operation of the apparatus of Fig. 3 will be readily understood from the explanation of the operation of the apparatus previously described.

It is characteristic of the several embodiments of the invention that the pressure of gas in the inlet or high pressure conduit section is automatically controlled in proportion to that of the gas in the outlet or low pressure conduit section, in the latter of which the pressure varies due to changes in resistance to flow incident to conditions of service. All forms of apparatus illustrated are also similar in that the constant pressure differential is maintained by a relief valve on the high pressure conduit section controlled by the gas pressure in the low pressure conduit section. In the apparatus of Fig. 1 a hydrostatic valve is used, and mechanical valves in those of Figs. 2 and 3. Manifestly the invention may, within the scope of the appended claims, be practiced by other forms of apparatus than those specifically shown and described.

I claim:

1. In a constant gas flow apparatus, the combination with a conduit having a constricted portion dividing the conduit into high and low pressure sections, of a gas relief valve on the high pressure section, and pressure-operated means communicating with the low pressure section for controlling said valve whereby a constant differential is automatically maintained between the pressures of gas flowing through said conduit sections.

2. In a constant gas flow apparatus, the combination with a conduit having a constricted portion dividing the conduit into high and low pressure sections, of a liquid column, a tube connected at one end to said high pressure section and having its other end open near the bottom portion of said liquid column, and a tube connecting said low pressure section with said liquid column whereby the height of the column may be varied according to the pressure of gas in said low pressure section.

In testimony whereof, I sign my name.

ROSCOE P. MASE.

Witness:
EDWIN O. JOHNS.